US009094601B2

(12) United States Patent
Chen (10) Patent No.: US 9,094,601 B2
(45) Date of Patent: Jul. 28, 2015

(54) IMAGE CAPTURE DEVICE AND AUDIO HINTING METHOD THEREOF IN FOCUSING

(71) Applicant: VIVOTEK INC., New Taipei (TW)

(72) Inventor: Jr-Bin Chen, New Taipei (TW)

(73) Assignee: VIVOTEK INC., New Taipei (TW)

( * ) Notice: Subject to any disclaimer, the term of this patent is extended or adjusted under 35 U.S.C. 154(b) by 157 days.

(21) Appl. No.: 13/908,219

(22) Filed: Jun. 3, 2013

(65) Prior Publication Data

US 2014/0009663 A1  Jan. 9, 2014

(30) Foreign Application Priority Data

Jul. 4, 2012 (TW) .............................. 101124123 A (51) Int. Cl.
*H04N 5/232* (2006.01)
(52) U.S. Cl.
CPC .................................. *H04N 5/23212* (2013.01)
(58) Field of Classification Search
CPC ..... H04N 5/23212; G03B 13/36; G01S 17/89
See application file for complete search history.

(56) References Cited

U.S. PATENT DOCUMENTS

| 2006/0044452 A1* | 3/2006 | Hagino ......................... 348/345 |
| 2007/0206937 A1* | 9/2007 | Kusaka ............................ 396/89 |
| 2008/0111910 A1* | 5/2008 | Nikkanen et al. ............. 348/345 |

\* cited by examiner

*Primary Examiner* — Luong T Nguyen
(74) *Attorney, Agent, or Firm* — Locke Lord LLP; Tim Tingkang Xia, Esq.

(57) ABSTRACT

An image capture device and an audio hinting method of focusing thereof are provided to perform the following steps. A first digital image is acquired by an image capture device. A focusing value of the first digital image is calculated by a focusing detection module. A second digital image is acquired by an image capture device. A focusing value of the second digital image is calculated by a focusing detection module. The focusing values of the first and second digital images are compared with each other by the focusing detection module. When the focusing values of the first and second digital images are different, a hint sound played by an audio output section is adjusted.

11 Claims, 7 Drawing Sheets

IMAGE CAPTURE DEVICE AND AUDIO HINTING METHOD THEREOF IN FOCUSING

CROSS-REFERENCE TO RELATED APPLICATIONS

This non-provisional application claims priority under 35 U.S.C. §119(a) on Patent Application No(s). 101124123 filed in Taiwan, R.O.C. on Jul. 4, 2012, the entire contents of which are hereby incorporated by reference.

TECHNICAL FIELD

The disclosure relates to an image capture device and a focusing method thereof, and more particularly to an image capture device and an audio hinting method thereof in focusing.

BACKGROUND

With the development of micro-electromechanical technology, the digital photographing becomes more popular. The digital photographing can be applicable to record many matters, e.g. scenery and cultural activities, or to the secure monitoring.

Generally, the auto focusing (AF) is used the most in the digital photographing, because users would pay attention rather to desired matters, e.g. the composition of photo, than to the adjustment of focus. The AF has the contrast-detection AF and the phase-detection AF. The contrast-detection AF provides high focusing accuracy but has slow focusing speed. The phase-detection AF provides high focusing speed but has low focusing accuracy.

Even though the AF has many advantages, the manual focusing is more suitable than the AF in some photographic environments. For the manual focusing, a sharp frame that is watched by human eyes is a fact to determine whether a captured image is in focus or not, thereby leading to do the digital photographing inconveniently.

SUMMARY

An audio hinting method according to an embodiment of the disclosure is applicable to an image capture device to provide focusing hint in manual focusing and includes the following steps. A first digital image is acquired. A focusing value of the first digital image is calculated. A second digital image is acquired. A focusing value of the second digital image is calculated. The focusing values of the first and second digital images are compared with each other. When the focusing value of the first digital image differs to the focusing value of the second digital image, an audio signal outputted by an audio output section is adjusted.

An image capture device according to an embodiment of the disclosure includes a light sensing module, an audio output section and a focusing detection module. The light sensing module is used for acquiring a first digital image and a second digital image. The audio output section is used for outputting an audio signal. The focusing detection module is electrically connected to the light sensing module and the audio output section, and used for respectively calculating a focusing value of the first digital image and a focusing value of the second digital image. When the focusing value of the first digital image differs to the focusing value of the second digital image, the audio signal is adjusted.

BRIEF DESCRIPTION OF THE DRAWINGS

The present disclosure will become more fully understood from the detailed description given herein below for illustration only and thus does not limit the present disclosure, wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1A:
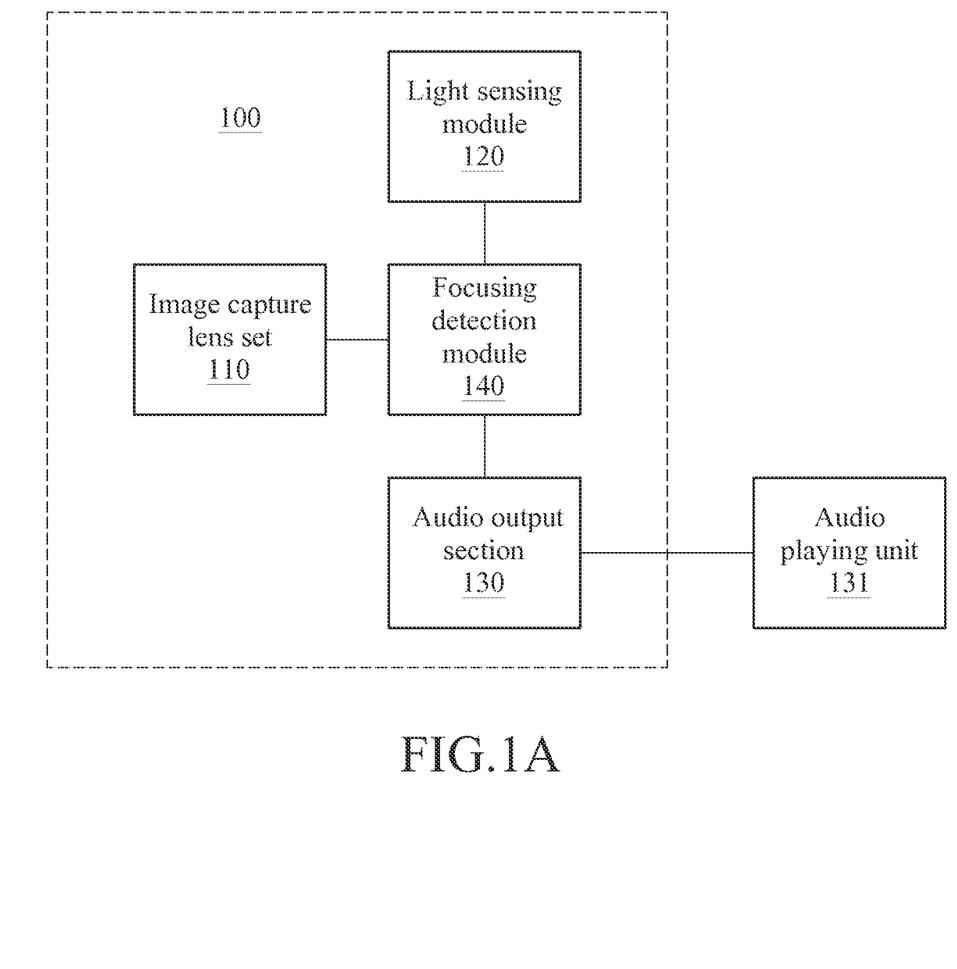
FIG. 1A is a block diagram of an image capture device in use according to an embodiment of the disclosure.
Figure 1B:
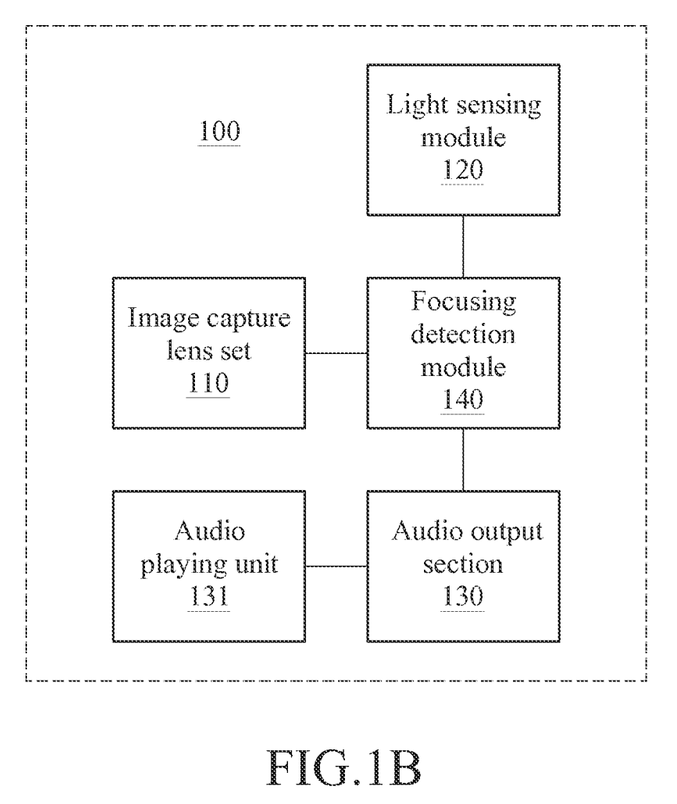
FIG. 1B is a schematic diagram of an image capture device according to an embodiment of the disclosure.

The disclosure can be applicable to an image capture device, e.g. a digital camera or a digital camcorder to provide focusing hint. Refer to FIG. 1A and FIG. 1B, an image capture device 100 includes an image capture lens set 110, a light sensing module 120, an audio output section 130 and a focusing detection module 140. The audio output section 130 is connected to an audio playing unit 131 which can be disposed in the image capture device 100 as shown in FIG. 1B, or be disposed outside the image capture device 100 as shown in FIG. 1A. The focusing detection module 140 is electrically connected to the light sensing module 120 and the audio output section 130.

The image capture lens set 110 includes at least one lens. When an image distance between the lens and an object is adjusted in manual focusing, an image of the object will be projected on the light sensing module 120. In the duration of adjusting the image distance, the relative process is defined as the manual focusing in the disclosure. The relative process of the manual focusing can be performed repeatedly.

For a manual focusing, digital images with various image distances may be captured at various time points. Hereinafter, a first time point and a second time point are taken as a simple example of the various time points for illustrating the operation of the disclosure. Firstly, the light sensing module 120 captures a first digital image at the first time point, and captures a second digital image at the second time point. An image distance associated with the first time point is different from an image distance associated with the second time point, and the first time point and the second time point have a time difference therebetween.

Subsequently, the audio output section 130 outputs a corresponding audio signal to the audio playing unit 131, so that a hint sound associated with the audio signal will be played while the manual focusing is performed. The audio output section 130 can control a volume or an audio frequency of the hint sound played by the audio playing unit 131 or control a time interval of playing the hint sound, so as to notify a user a focusing result corresponding to the hint sound.

Generally, the hint sound has a preset volume in the beginning of the manual focusing. During the duration of the manual focusing, the focusing detection module 140 adjusts the audio signal according to the focusing result, and drives the audio playing unit 131 via the audio output section 130 to change the hint sound.

The focusing detection module 140 determines whether the first digital image 310 and the second digital image are in focus through a contrast-detection focusing algorithm, a phase-detection focusing algorithm or other focusing manners. The audio hinting method depending on an example of a conventional focusing method is described below.

Figure 2:
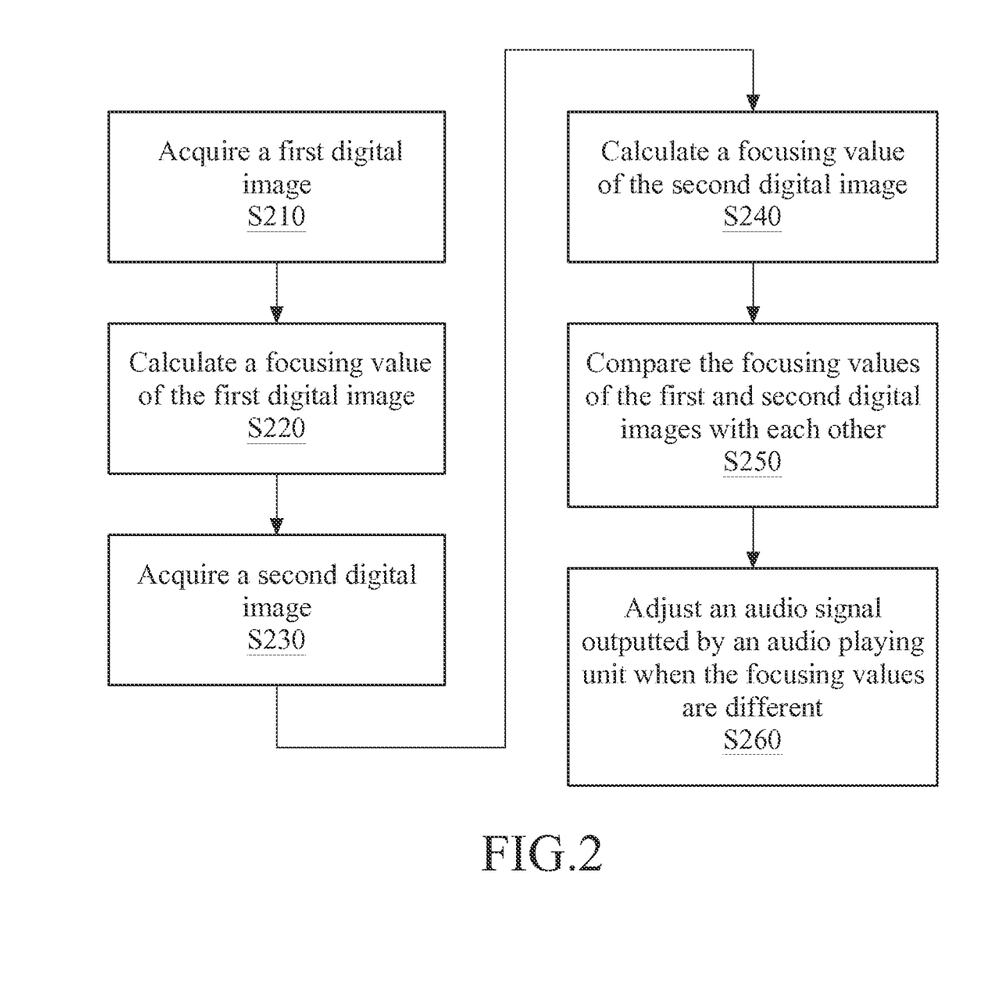
FIG. 2 is a flowchart of an audio hinting method according to an embodiment of the disclosure.

FIG. 2 is a flowchart of an audio hinting method according to an embodiment of the disclosure. The audio hinting method includes the following steps. A first digital image is acquired (step S210). A focusing value of the first digital image is calculated (step S220). A second digital image is acquired (step S230). A focusing value of the second digital image is calculated (step S240). The focusing values are contrast values obtained by calculating contrast values of the first and second digital images according to a contrast-detection focusing algorithm. The focusing values of the first and second digital images are compared with each other (step S250). When the focusing value of the first digital image differs to the focusing value of the second digital image, an audio signal outputted by an audio output section is adjusted (step S260). The detailed operation is described as follows.

Figure 3A:
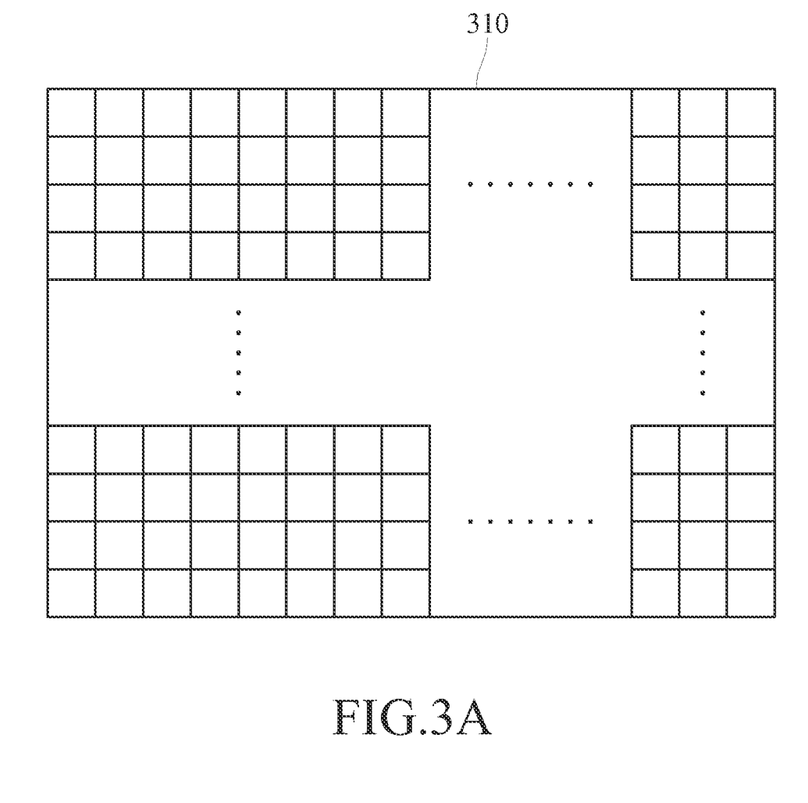
FIG. 3A is a schematic diagram of an digital image in the disclosure.

In the manual focusing, a plurality of successive digital images may be captured, and two digital images defined as the first digital image 310 and the second digital image are taken as an example hereinafter. The focusing detection module 140 calculates the focusing values of the first digital image 310 and the second digital image. The first digital image 310 includes a plurality of pixels as shown in FIG. 3A.

Figure 3B:
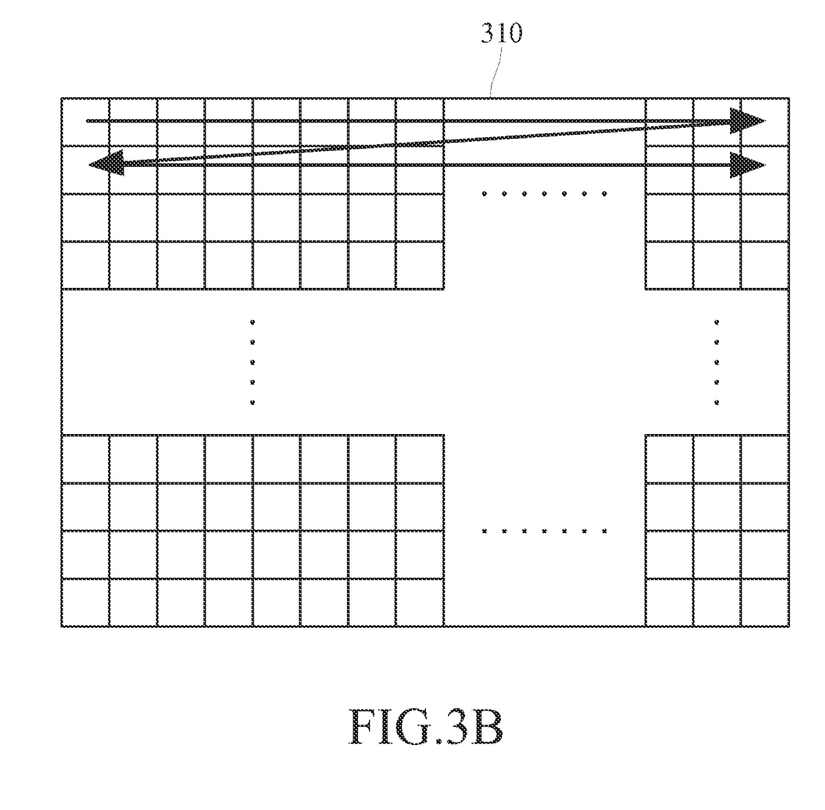
FIG. 3B is a schematic diagram of pixel selection in the disclosure.
Figure 3C:
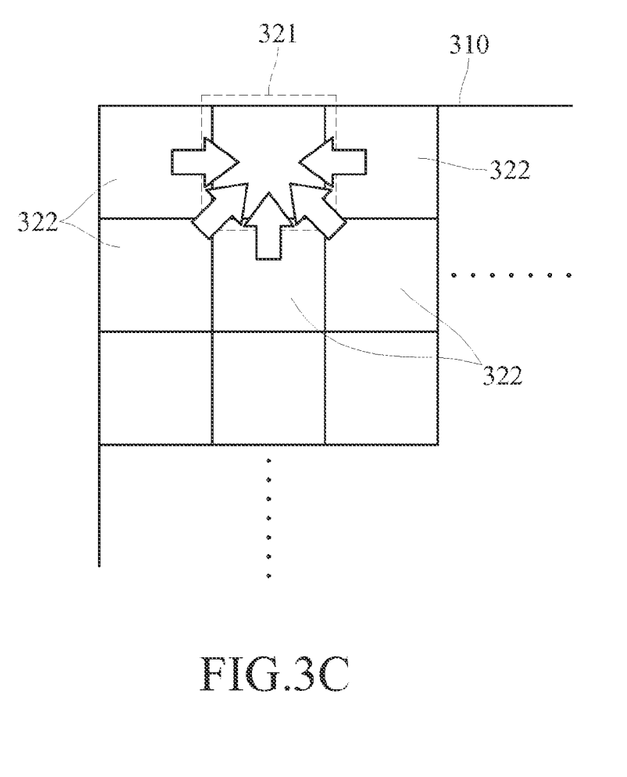
FIG. 3C is a schematic diagram of pixels ambient to the selected pixel according to an embodiment of the disclosure.
Figure 3D:
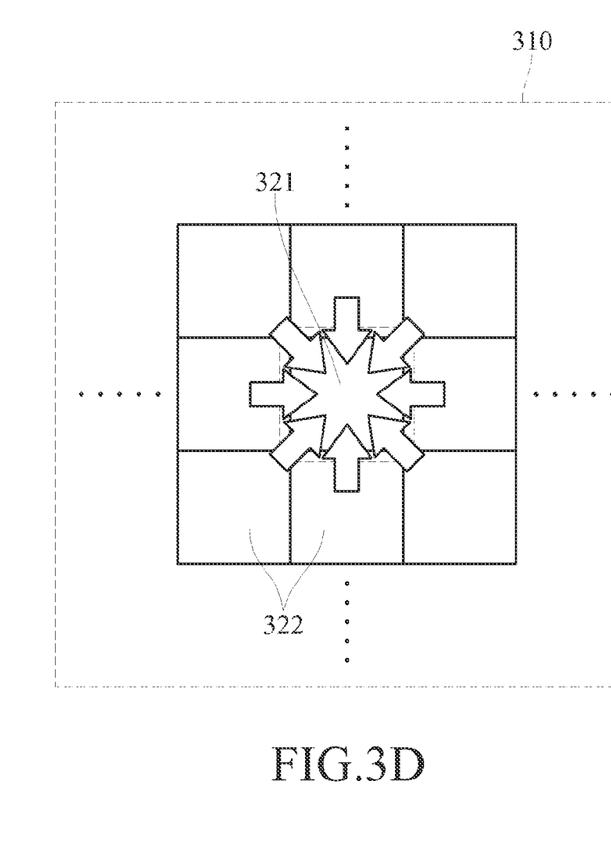
FIG. 3D is a schematic diagram of pixels ambient to the selected pixel according to an embodiment of the disclosure.

Firstly, one target pixel 321 in the first digital image 310 is selected. In an embodiment, a sequence of selecting pixels can start from left to right and from top to bottom along a direction arrowed in FIG. 3B. After the target pixel 321 is selected, the focusing detection module 140 further selects other pixels adjacent to the target pixel 321. The pixels adjacent to the target pixel 321 are defined as ambient pixels 322 hereinafter. In the disclosure, the target pixel 321 is taken as a center, the ambient pixels 322 closed to the target pixel 321 the most are selected. If the target pixel 321 is located at the edge of the first digital image 310, the ambient pixels 322 arrowed in FIG. 3C are selected. If the target pixel 321 is located in the first digital image 310 but not at the edge of the first digital image 310, the ambient pixels 322 arrowed in FIG. 3D are selected.

After the target pixel 321 and the corresponding ambient pixels 322 are selected, the focusing detection module 140 respectively calculates a difference between a pixel value of the target pixel 321 and a pixel value of each of the ambient pixels 322. Herein, the differences are defined as first stage contrast values. For example, there are eight ambient pixels 322 adjacent to the target pixel 321. In this case, the focusing detection module 140 respectively calculates a difference between the pixel value of the target pixel 321 and the pixel value of each of the eight ambient pixels 322 to obtain eight first stage contrast values. Subsequently, the eight first stage contrast values are summed into a second stage contrast value.

Similarly, first stage contrast values and a second contrast value associated with the ambient pixels 322 adjacent to the target pixel 321 located at the edge can be obtained. After the second stage contrast value associated with each pixel in the first digital image 310 is obtained, the focusing detection module 140 sums all the second stage contrast values into a focusing value of the first digital image 310. Similarly, the focusing detection module 140 also obtains a focusing value of the second digital image through the aforementioned calculation manner. Hereinafter, the focusing value of the first digital image 310 is defined as a first focusing value, and the focusing value of the second digital image is defined as a second focusing value.

After the first focusing value and the second focusing value are obtained, the focusing detection module 140 compares the first focusing value with the second focusing value. The comparison result of the first focusing value and the second focusing value has two states. The first one of the two states is that the first focusing value is less than the second focusing value, and the second one of the two states is that the first focusing value is greater than the second focusing value. The focusing detection module 140 adjusts the audio signal according to the two states and drives the audio playing unit 131 via the audio output section 130 to play various hint sounds.

When the first state occurs, the volume or audio frequency of the hint sound played by the audio playing unit 131 is increased or the time interval of playing the hint sound is reduced. When the second state occurs, the volume or audio frequency of the hint sound played by the audio playing unit 131 is reduced or the time interval of playing the hint sound is increased. When the hint sound has the greatest volume, the greatest audio frequency or the shortest time interval in the manual focusing, it means that the focusing operation is completed.

Figure 4:
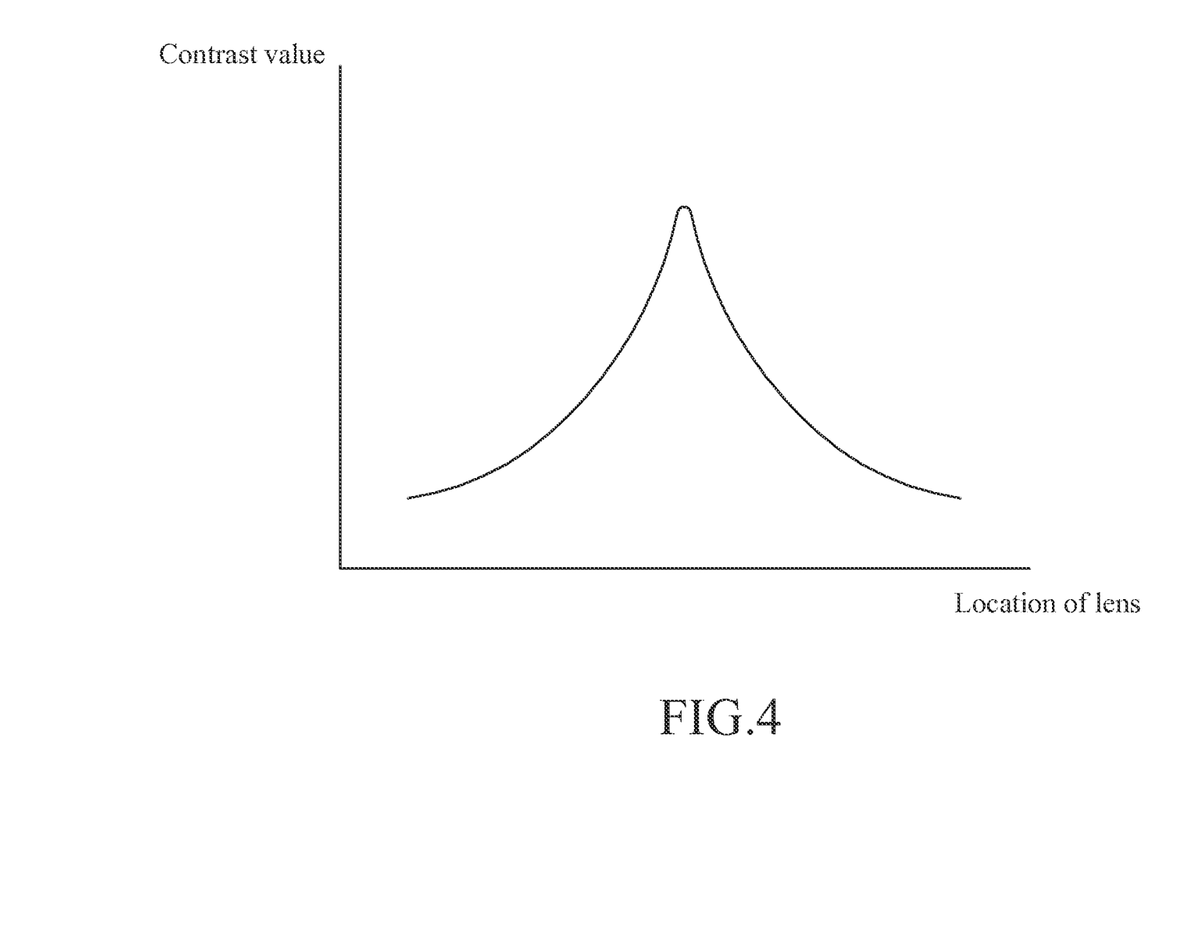
FIG. 4 is a schematic curve diagram of the disclosure.

As set forth above, the disclosure summarizes the obtained contrast values of the digital images versus the various locations of the lens associated with various image distances to obtain a focusing curve as shown in FIG. 4. In FIG. 4, the abscissa represents the location of the lens, and the ordinate represents the contrast value of the digital image captured at each time point. Based on the aforementioned description, the focusing curve in FIG. 4 can be segmented into a first segment starting from bottom to top at the left side, and a second segment starting from top to bottom at the right side.

For example, the adjustment for the volume of the hint sound is taken as an example to illustrate the disclosure. For the first segment, the contrast value will be changed with the image distance, which corresponds to the aforementioned first state, so that the volume of the hint sound played by the audio playing unit 131 is increased gradually during the manual focusing. However, the corresponding contrast value will be dropped when a focus is adjusted excessively, and such a situation is located at the second segment instead of the first segment. Herein, the volume of the hint sound played by the audio playing unit 131 is dropped. Therefore, the volume of the hint sound played by the audio playing unit 131 is the greatest when the focus is correct or the most suitable. In this way, the audio frequency or the time interval associated with the hint sound played by the audio playing unit 131 can also be adjusted.

Besides, the phase-detection focusing algorithm also calculates and obtains the phase values of the digital images captured at various time points and then utilizes the phase values to adjust the hint sound played by the audio playing unit 131 through the aforementioned manner.

In this and some embodiments, the disclosure also provides more manners to adjust the hint sound. For example, when the first focusing value of the first digital image 310 is greater than the second focusing value of the second digital image, the volume or the frequency of the hint sound is increased or the time interval of playing the hint sound is reduced. In contrast, when the first focusing value of the first digital image 310 is less than the second focusing value of the second digital image, the volume or frequency of the hint sound is reduced or the time interval of playing the hint sound is increased.

In the disclosure, the audio hinting method is provided to determine whether an image captured by the image capture device is focused or not, and the image capture device, according to the focusing result, changes the sound played by the audio playing unit, to notify the user in the manual focusing.

What is claimed is:

1. An audio hinting method applicable to an image capture device to provide focusing hint in manual focusing, comprising steps of:
   acquiring a first digital image;
   calculating a focusing value of the first digital image;
   acquiring a second digital image;
   calculating a focusing value of the second digital image;
   comparing the focusing values of the first and second digital images; and
   when the focusing value of the first digital image differs to the focusing value of the second digital image, adjusting an audio signal outputted by an audio output section.

2. The audio hinting method according to claim 1, further comprising:
   repeatedly performing all the steps during the manual focusing.

3. The audio hinting method according to claim 1, wherein the focusing values are contrast values obtained by calculating contrast values of the first and second digital images according to a contrast-detection focusing algorithm.

4. The audio hinting method according to claim 1, wherein the focusing values are phase values obtained by calculating phase values of the first and second digital images according to a phase-detection focusing algorithm.

5. The audio hinting method according to claim 1, wherein when the focusing value of the first digital image is less than the focusing value of the second digital image, the audio signal is adjusted and an audio playing unit is driven by the audio output section, in order to increase a volume or an audio frequency of a hint sound played via the audio playing unit or to reduce a time interval of playing the hint sound; and
   when the focusing value of the first digital image is greater than the focusing value of the second digital image, the volume or audio frequency of the hint sound is reduced or the time interval of playing the hint sound is increased.

6. The audio hinting method according to claim 1, wherein when the focusing value of the first digital image is greater than the focusing value of the second digital image, the audio signal is adjusted, and an audio playing unit is driven by the audio output section, in order to increase a volume or an audio frequency of a hint sound played by the audio playing unit or to reduce a time interval of playing the hint sound; and
   when the focusing value of the first digital image is less than the focusing value of the second digital image, the volume or audio frequency of the hint sound is reduced or the time interval of playing the hint sound is increased.

7. An image capture device, comprising:
   a light sensing module, used for acquiring a first digital image and a second digital image;
   an audio output section, used for outputting an audio signal; and
   a focusing detection module, electrically connected to the light sensing module and the audio output section, and used for respectively calculating a focusing value of the first digital image and a focusing value of the second digital image;
   wherein when the focusing value of the first digital image differs to the focusing value of the second digital image, the audio signal is adjusted.

8. The image capture device according to claim 7, wherein the focusing values are contrast values obtained by calculating contrast values of the first and second digital images according to a contrast-detection focusing algorithm.

9. The image capture device according to claim 7, wherein the focusing values are phase values obtained by calculating phase values of the first and second digital images according to a phase-detection focusing algorithm.

10. The image capture device according to claim 7, wherein when the focusing value of the first digital image is less than the focusing value of the second digital image, the focusing detection module adjusts the audio signal, and drives an audio playing unit by the audio output section, so as to increase a volume or an audio frequency of a hint sound played by the audio playing unit or to reduce a time interval of playing the hint sound; and
   when the focusing value of the first digital image is greater than the focusing value of the second digital image, the focusing detection module reduces the volume or audio frequency of the hint sound or increases the time interval of playing the hint sound.

11. The image capture device according to claim 7, wherein when the focusing value of the first digital image is greater than the focusing value of the second digital image, the audio signal is adjusted, and an audio playing unit is driven by the audio output section, so as to increase a volume or an audio frequency of a hint sound played by the audio playing unit or to reduce a time interval of playing the hint sound; and
   when the focusing value of the first digital image is less than the focusing value of the second digital image, the volume or audio frequency of the hint sound is reduced, or the time interval of playing the hint sound is increased.

* * * * *